(12) United States Patent
Ruszala et al.

(10) Patent No.: US 9,721,231 B2
(45) Date of Patent: *Aug. 1, 2017

(54) COMPUTER SYSTEM FOR PROCESSING DATA FROM A PLURALITY OF REMOTE INPUT DEVICES FOR TRANSMISSION TO A THIRD-PARTY COMPUTER

(71) Applicant: HARTFORD FIRE INSURANCE COMPANY, Hartford, CT (US)

(72) Inventors: Anthony C. Ruszala, Simsbury, CT (US); Steven A. Hatch, Tolland, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 277 days.

This patent is subject to a terminal disclaimer.

(21) Appl. No.: 14/452,036

(22) Filed: Aug. 5, 2014

(65) Prior Publication Data

US 2014/0343973 A1 Nov. 20, 2014

Related U.S. Application Data

(63) Continuation of application No. 12/582,174, filed on Oct. 20, 2009, now Pat. No. 8,799,025.

(60) Provisional application No. 61/226,087, filed on Jul. 16, 2009.

(51) Int. Cl.
*G06Q 10/10* (2012.01)
*G06Q 40/08* (2012.01)
*G06Q 30/04* (2012.01)

(52) U.S. Cl.
CPC ......... *G06Q 10/1057* (2013.01); *G06Q 30/04* (2013.01); *G06Q 40/08* (2013.01)

(58) Field of Classification Search
None
See application file for complete search history.

(56) References Cited

U.S. PATENT DOCUMENTS

| 4,987,538 | A | 1/1991 | Johnson et al. | |
|---|---|---|---|---|
| 7,395,217 | B1* | 7/2008 | Stevens | G06Q 40/08 705/2 |
| 2001/0037224 | A1 | 11/2001 | Eldridge et al. | |
| 2002/0103680 | A1* | 8/2002 | Newman | G06Q 30/02 705/4 |
| 2002/0128883 | A1 | 9/2002 | Harris | |
| 2005/0182666 | A1 | 8/2005 | Perry et al. | |
| 2005/0203828 | A1* | 9/2005 | Lyakovetsky | G06Q 40/025 705/38 |
| 2006/0253306 | A1* | 11/2006 | Richardson | G06Q 10/1057 705/4 |

(Continued)

OTHER PUBLICATIONS

*U.S. Bancorp* Vs. *Solutran, Inc.*, CBM2014-00076 (PTAB Aug. 7, 2014).*

*Primary Examiner* — Robert R Niquette
(74) *Attorney, Agent, or Firm* — Howard IP Law Group, PC (57) ABSTRACT

According to some embodiments, workers' compensation claims are received at a payor processing system from a plurality of remote bill input devices. The workers' compensation claims may be transformed in accordance with a jurisdiction-based claims processing rule. The transformed workers' compensation claims may then be transmitted to a workers' compensation adjudication engine.

18 Claims, 9 Drawing Sheets

(56) References Cited

U.S. PATENT DOCUMENTS

| | | |
|---|---|---|
| 2007/0112670 A1 | 5/2007 | DeFrancesco et al. |
| 2008/0154672 A1* | 6/2008 | Skedsvold ............ G06Q 10/00 705/7.15 |
| 2008/0243559 A1 | 10/2008 | Stevens et al. |
| 2009/0106053 A1 | 4/2009 | Walker et al. |
| 2010/0094666 A1 | 4/2010 | Pendergrass et al. |
| 2011/0010186 A1 | 1/2011 | Mashore et al. |
| 2011/0145011 A1 | 6/2011 | Shell et al. |

* cited by examiner

FIG. 1

PRIOR ART

COMPUTER SYSTEM FOR PROCESSING DATA FROM A PLURALITY OF REMOTE INPUT DEVICES FOR TRANSMISSION TO A THIRD-PARTY COMPUTER

CROSS-REFERENCE TO RELATED APPLICATIONS

The present application is a continuation of copending U.S. patent application Ser. No. 12/582,174 entitled "Insurance Claim Data Exchange," filed Oct. 20, 2009, which in turn claims the benefit of U.S. Provisional Patent Application No. 61/226,087 entitled "Systems and Methods Having a Claim Data Exchange to Facilitate Workers' Compensation Claims Processing", filed on Jul. 16, 2009, the entire contents of all of which are incorporated herein by reference for all purposes.

BACKGROUND

A "payor" associated with an insurance program may facilitate payments made to health care providers. In the United States ("US"), for example, a payor might receive bills from a doctor, hospital, or pharmacy in connection with the Medicaid and/or Medicare insurance programs. Typically, health care provides use standard codes (e.g., describing treatments or medicines given to patients) and/or electronic transmission formats when submitting bills or claims to be processed by a payor. Moreover, the rules that govern such programs apply through the US and change relatively infrequently. As a result, the processing and review of these types of claims by a payor may be performed in a timely and efficient manner.

Claims associated with other types of insurance programs, however, may be more complex and time consuming to process. Consider, for example, a payor enterprise that arranges to provide payments to doctors, hospitals, and/or pharmacies in connection with the various workers' compensation insurance systems established throughout the US. Note that these programs are implemented on a state-by-state basis and different codes and/or transmission formats might be used by health care providers in different states. Moreover, different rules might apply to the processing of claims in each state (e.g., different rules associated with appropriate payment amounts). Still further, changes may be made to the rules on a relatively frequent basis (e.g., because fifty different states may review and adjust rules at various times). As a result, the processing of claims for these types of insurance programs may be complex, time consuming, and error prone and a payor may find it difficult to maintain an automated claims processing system.

SUMMARY OF THE INVENTION

According to some embodiments, workers' compensation claims are received at a payor processing system from a plurality of remote bill input devices. The workers' compensation claims may be transformed in accordance with a jurisdiction-based claims processing rule. The transformed workers' compensation claims may then be transmitted to a workers' compensation adjudication engine.

Other embodiments include: means for receiving, at a payor processing system, workers' compensation claims from a plurality of remote bill input devices; means for automatically transforming the workers' compensation claims in accordance with a jurisdiction-based claims processing rule; and means for transmitting the transformed workers' compensation claims directly to a workers' compensation adjudication engine.

In some embodiments, a communication device associated with claim data exchange receives information from and/or transmits information to remote devices. The information may be exchanged, for example, via public and/or proprietary communication networks.

A technical effect of some embodiments of the invention is an improved and automated claim processing system and data exchange for payors, health care providers, and workers. With this and other advantages and features that will become hereinafter apparent, a more complete understanding of the nature of the invention can be obtained by referring to the following detailed description and to the drawings appended hereto.

DETAILED DESCRIPTION

Figure 1:
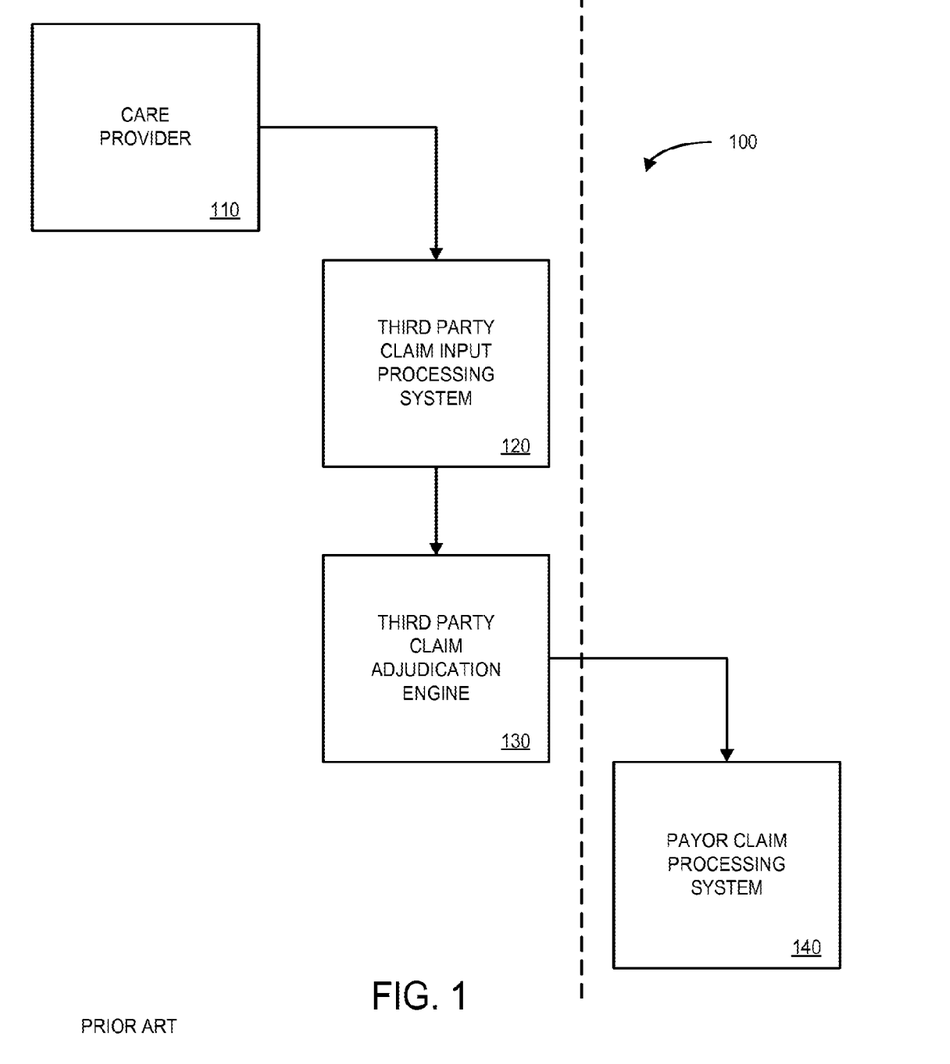
FIG. 1 is block diagram of a system for processing workers' compensation claims.

FIG. 1 is block diagram of a system 100 for processing workers' compensation claims. A "payor" associated with an insurance program may facilitate payments made to health care providers 110. A workers' compensation claim may include both a lost time portion and a medical bill portion. As used herein, automated "claim" processing is associated with the medical bill portion of the workers' compensation claim. Initially, a care provider 110 may submit a claim (e.g., a bill or invoice) to a third party claim input processing system 120 (e.g., by sending a paper invoice, a facsimile, or an electronic message to the third party claim input processing system 120). Multiple claims (e.g., bills) can be associated with a single insured's injury. For example, an injured insured may visit two or more different medicals specialist and require different medicines.

The third party claim input processing system 120 may then re-format the information and forward information about the claim to a third party claim adjudication engine 130. The third party claim adjudication engine 130 may then review the claim (e.g., medical bill) and determine whether or not the claim should be paid and/or an appropriate amount that should be paid to the care provider 110 (e.g., based on the workers' compensation rules applicable given the geographic location of the care provider 110). The third party claim adjudication engine 130 may then forward the information to a payor claim processing system 140 (where the payor is represented by the area to the right of the dashed line in FIG. 1), which in turn may arrange for the care provider 110 to receive payment.

In this way, the system 100 may help provide payments to care providers 110 (e.g., doctors, hospitals, and/or pharmacies) in connection with the various workers' compensation insurance systems established throughout the US. Note that these programs are implemented on a state-by-state basis and different codes and/or transmission formats might be used by health care providers in different states (e.g., different C schedules may be used by different states). Moreover, different rules might apply to the processing of claims in each state (e.g., different rules associated with appropriate payment amounts, timing requirements, and/or treatment guidelines). Still further, changes may be made to the rules on a relatively frequent basis (e.g., because fifty different states may review and adjust rules at various times). As a result, the processing of claims for these types of insurance programs may be complex, time consuming, and error prone and the third party claim input processing system 120, third party claim adjudication engine 130, and payor claim processing system 140 may find it difficult to maintain automated claims processing apparatus.

Figure 2:
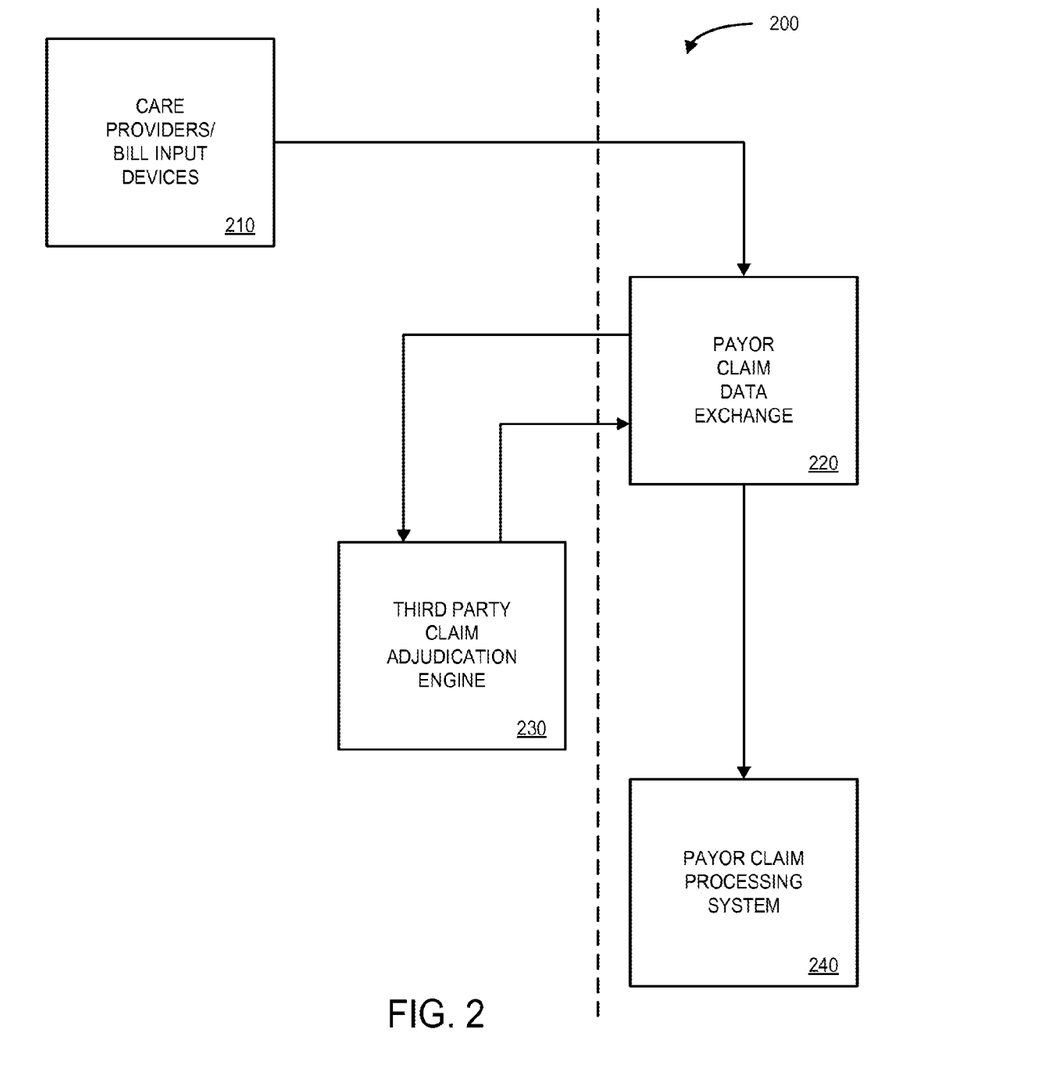
FIG. 2 is block diagram of a system for processing workers' compensation claims according to some embodiments of the present invention.

To address these issues in connection with some embodiments of the present invention, FIG. 2 is block diagram of a system 200 for processing workers' compensation claims. As before, a payor associated with an insurance program may facilitate payments made to health care providers 210. In this case, a care provider 210 may submit a claim (e.g., bill) to a remote payor claim data exchange 220 (e.g., by sending a paper invoice, a facsimile, or an electronic message to the payor claim data exchange 220).

The payor claim data exchange 220 may then automatically re-format the information and forward information about the claim to a third party claim adjudication engine 230. As used herein the term "automated" indicates that at least some part of a step associated with a process or service is performed with little or no human intervention. By way of examples only, the payor claim data exchange might be associated and/or communicate with a Personal Computer (PC), an enterprise server, and/or a database farm.

The third party claim adjudication engine 230 may then review the claim and determine whether or not the claim should be paid and/or an appropriate amount that should be paid to the care provider 210 (e.g., based on the workers' compensation rules applicable given the geographic location of the care provider 210). By way of examples only, the third party claim adjudication engine 230 might look for duplicate claims, incomplete or incorrect data in a required data field, and/or evaluate a claim number to determine whether or not it is valid. The third party claim adjudication engine 230 may then return the determined information to the payor claim data exchange 220, which may in turn use that information to transmit data to a payor claim processing system 240 (where the payor is represented by the area to the right of the dashed line in FIG. 1), which in turn may arrange for the care provider 210 to receive payment.

Any of the devices described in connection with the system 200 may access information in one or more databases. The databases may include, for example, information about claims or rules that govern claims. Moreover, any of the devices may exchange information via a communication network. These devices (and any of the other devices described herein) could be associated with, for example, a server, a PC, a mobile or laptop computer, or any other appropriate storage and/or communication device to exchange information via a web site and/or a communication network. As used herein, devices (including those associated with the payor claim data exchange 220 and any other device described herein) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

The devices of FIG. 2 might, according to some embodiments, be accessible via a Graphical User Interface (GUI). The GUI might be used, for example, to dynamically display existing claim information, to receive new claim information, and/or to input or output information about rules that govern workers' compensation claims.

Although a single payor claim data exchange 220 is shown in FIG. 2, any number of such devices may be included. Moreover, various devices described herein might be combined according to embodiments of the present invention. For example, in some embodiments, the payor claim data exchange 220 and payor claim processing system 240 might be co-located and/or may comprise a single apparatus.

The payor claim data exchange 220 might include, for example, a communication device to receive information from a plurality of remote care provider/bill input devices 210. The provider/bill input devices 210 might be associated with, for example, a health care provider, a scanning service, an e-bill provider, and/or a pharmacy benefits manager.

The payor claim data exchange 220 might further include a processor coupled to the communication device and a storage device in communication with the processor and storing instructions adapted to be executed by said processor to receive a first workers' compensation claim from a first remote bill input device 210 and to receive a second workers' compensation claim from a second remote bill input device 210. In this case, the payor claim data exchange 220 might transform the first and second workers' compensation claims in accordance with a claims processing rule. Moreover, the payor claim data exchange 220 might transmit the transformed first and second workers' compensation claims to third party adjudication engine 230.

The third party adjudication engine 230 might, for example, integrate with one or more Preferred Provider Organizations ("PPOs") and/or pharmacy networks and implement bill adjudication model that is regulatory compliant. The third party adjudication engine 230 might also, in some cases, provide pre-processing edits (e.g., data and claim validation) and/or re-submission and duplicate processing. The third party adjudication engine 230, in some embodiments, may further generate an explanation of benefits, provide state and carrier reporting, implement claim management, and support an image viewer to display document images.

Note that the payor claim data exchange 220 may be implemented as an exchange having "plug and play" components that may be updated or replaced in a relatively straight forward manner. The payor claim data exchange 220 may also be associated with the payor claim processing system 240 and/or a bill pre-processing system (not illustrated in FIG. 2). Such an approach might provide flexibility to integrate and accept medical bills from multiple e-bill and scanning vendors (e.g., bill intake from the devices 210), provide a correspondence library, implement workflow management, invoice PPO fees, maintain vendor files. According to some embodiments, the payor claim data exchange 220 may provide exception processing in connection with claims, such as non-standard bill processing, bill blocking, claim verification, and/or provider matching. Note that the payor claim data exchange 220 may further implement a duplicate claim identification process (e.g., to see if two claims are associated with a single treatment), document checking, expense bills tracking, validation of any edits made to claims, a reporting system (e.g., associated and integrated with a data warehouse).

The claims processing rule applied by the payor claim data exchange 220 may be based at least in party on a geographic location associated with a workers' compensation claim (e.g., claims from New York and California might be translated in different ways). According to some embodiments, the claims processing rule is associated with an automated vendor identification process. For example, the payor claim data exchange 220 might use the name and address of a care provider in an attempt locate the provider in a database. If a potential provider is found (e.g., with a 90% confidence), then the payor claim data exchange 220 might supplement the claim with further information about that vendor.

In other cases, the claims processing rule applied by the payor claim data exchange 220 might be associated with data screening, automated data population, automated data translation (e.g., in accordance with a particular protocol or language), and/or a data cleaning process. The claims processing rule is associated with a demographic analysis process (e.g., the payor claim data exchange 220 might provide demographic information about a batch of workers' compensation claims).

Figure 3:
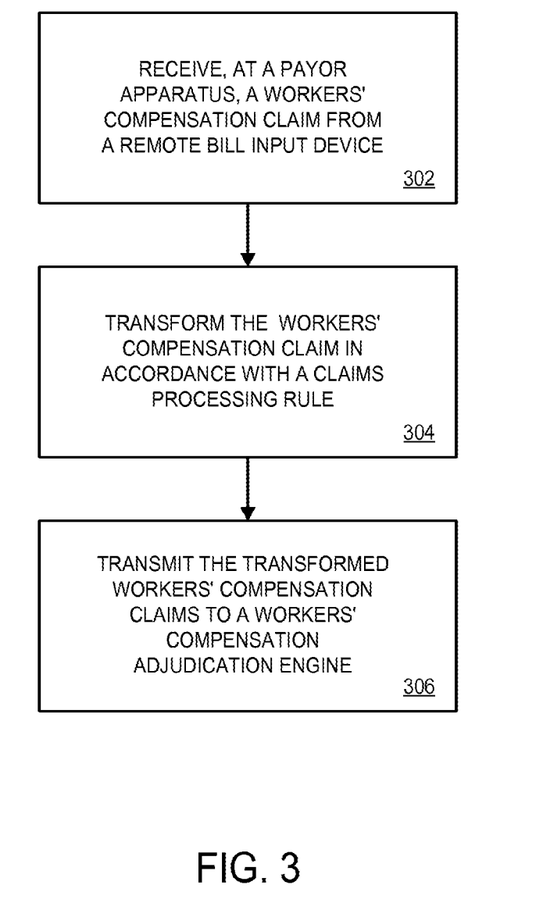
FIG. 3 illustrates a method according to some embodiments of the present invention.

FIG. 3 illustrates a method that might be performed, for example, by some or all of the elements of the system 200 described with respect to FIG. 2 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 302, workers' compensation claims are received, at a payor apparatus (e.g., a processing system), from a plurality of remote bill input devices. For example, the payor processing system might receive claims from health care providers and electronic billing services. The workers' compensation claims may then be automatically transformed at 304 in accordance with a jurisdiction-based claims processing rule. For example, claims from a first state might be re-formatted using a first rule while claims from a second state are re-formatted using a different rule. According to some embodiments, the transformation is associated with converting the workers' compensation claims into an extensible mark-up language format.

At 306, the transformed workers' compensation claims may be transmitted directly to a workers' compensation adjudication engine. For example, each claim might be transmitted after it is transformed or a batch of claims might be transmitted on a periodic basis (e.g., each night).

It might then be arranged for a health care provider to receive payment based at least in part on information subsequently received from the workers' compensation adjudication engine. Moreover, the payor processing system may export some or all of the data to a reporting system, a data warehouse, and/or a reconciliation engine. According to other embodiments, the payor processing system provides exception handling processing for flagged workers' compensation claims and/or stores image information associated with the workers' compensation claims in an image repository.

Figure 4:
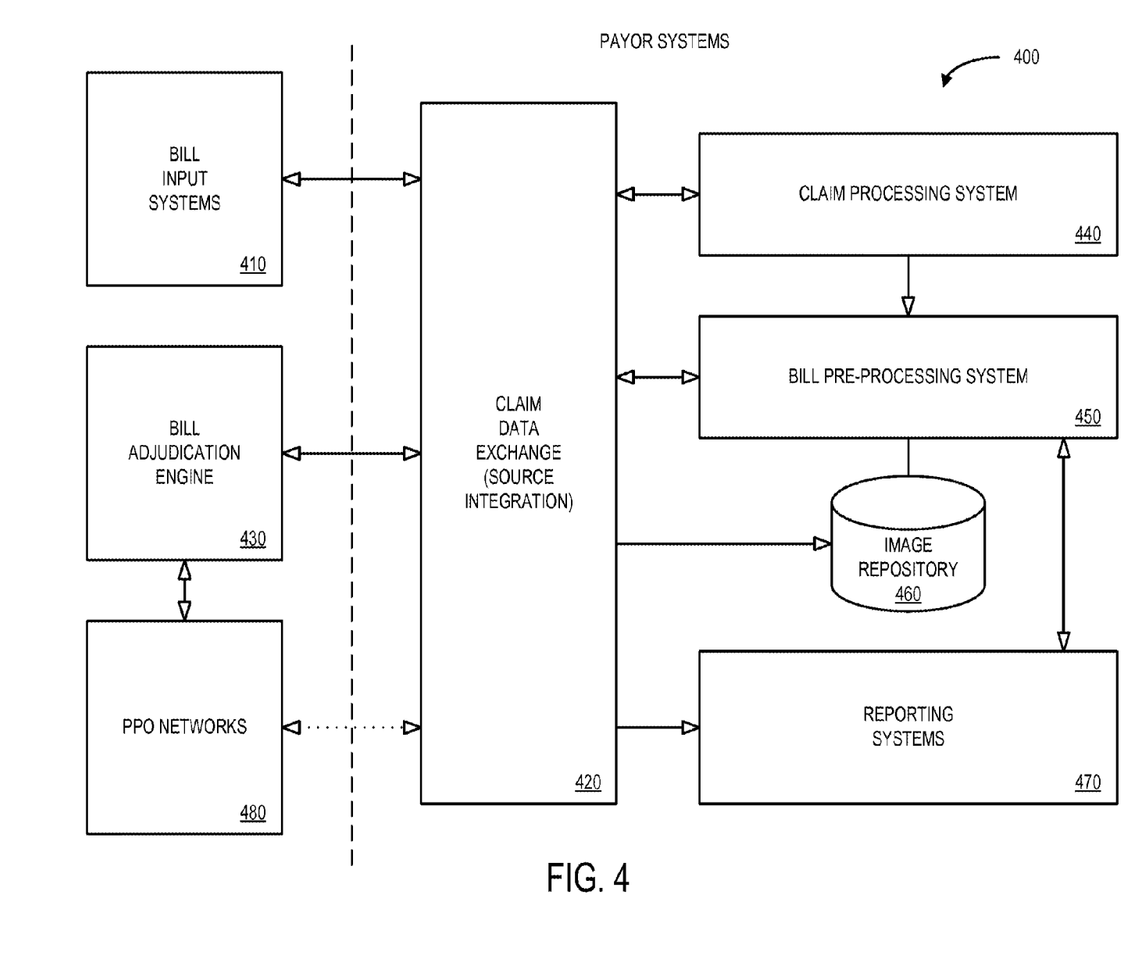
FIG. 4 is a more detailed block diagram of a system for processing workers' compensation claims according to some embodiments of the present invention.

Note that the method of FIG. 3 and the system 200 of FIG. 2 are provided only as examples, and implementations of embodiments of the present invention might be structured in any number of ways. For example, FIG. 4 is a more detailed block diagram of a system 400 for processing workers' compensation claims according to some embodiments of the present invention.

In this case, various remote bill input systems 410 may exchange information with a claim data exchange 420 (e.g., via postal mail, facsimile, public networks, and/or pharmacy networks). The bill input systems 410 may, for example, exchange bill data, images, and acknowledge messages with the claim data exchange 420 using File Transfer Protocol ("FTP") communications.

The claim data exchange 420 might process inbound and outbound information and implement key functions to de-batch files, log key elements, convert data into an Extensible Mark-Up Language ("XML") format, handle errors, generate acknowledgements and notifications, and support the generation of report analytics.

The claim data exchange 420 may then exchange information with a bill adjudication engine 430 in connection with the workers' compensation claims. For example, the claim data exchange 420 and bill adjudication engine 430 might exchange bill information, claim information, payment information, vendor data, and/or reporting information with the bill adjudication engine. The bill adjudication engine 430 may provide bill process functions, adjudicate the bills, and provide payment information to the payor. According to some embodiments, the bill adjudication engine 430 may exchange information with one or more PPO networks 480 (e.g., re-pricing data associated with payment determinations). Note that in some embodiments, the PPO networks 480 exchange information directly with the claim data exchange 420 (illustrated by a dashed arrow in FIG. 4).

The claim data exchange 420 may also exchange information with a claim processing system 440, a bill pre-processing system 450, an image repository 460 (e.g., associated with an image database), and/or a reporting system 470. The claim processing system 440 might, for example, be associated with claim demographics, injury summaries, treatment plans, and/or claim verification. According to some embodiments, the claim processing system 440 exchanges claim, payment, and vendor data with the claim data exchange 420 to support a receipt and disbursement process and/or loss reporting.

The bill pre-processing system 450 might, for example, exchange bill data with the claim data exchange 420 in connection with non-standard medical bills, verification processes, re-submission and duplicate checking, claim blocking, and/or vendor validations. The bill pre-processing system 450 might further provide exception handling functions, shadow letter generation, intake reporting, inventory reporting, and/or exception status reporting. According to some embodiments, the bill pre-processing system 450 also submits bills to the bill adjudication engine (via the claim data exchange 420) and generates work requests to create tasks and notes, including claim verification work requests. The image repository 460 may receive images from the claim data exchange 420 and provide images to the bill preprocessing system 450. The reporting systems 470 may receive reporting data from the claim data exchange 420 and/or be associated with a data warehouse (e.g., that receives a daily feed of bill data generated by the bill adjudication engine 430). The reporting systems 470 may, for example, exchange tracking data with the bill pre-processing system 450 and generate claims financial reports, actuarial services data, and PPO bulk bill reporting.

Figure 5:
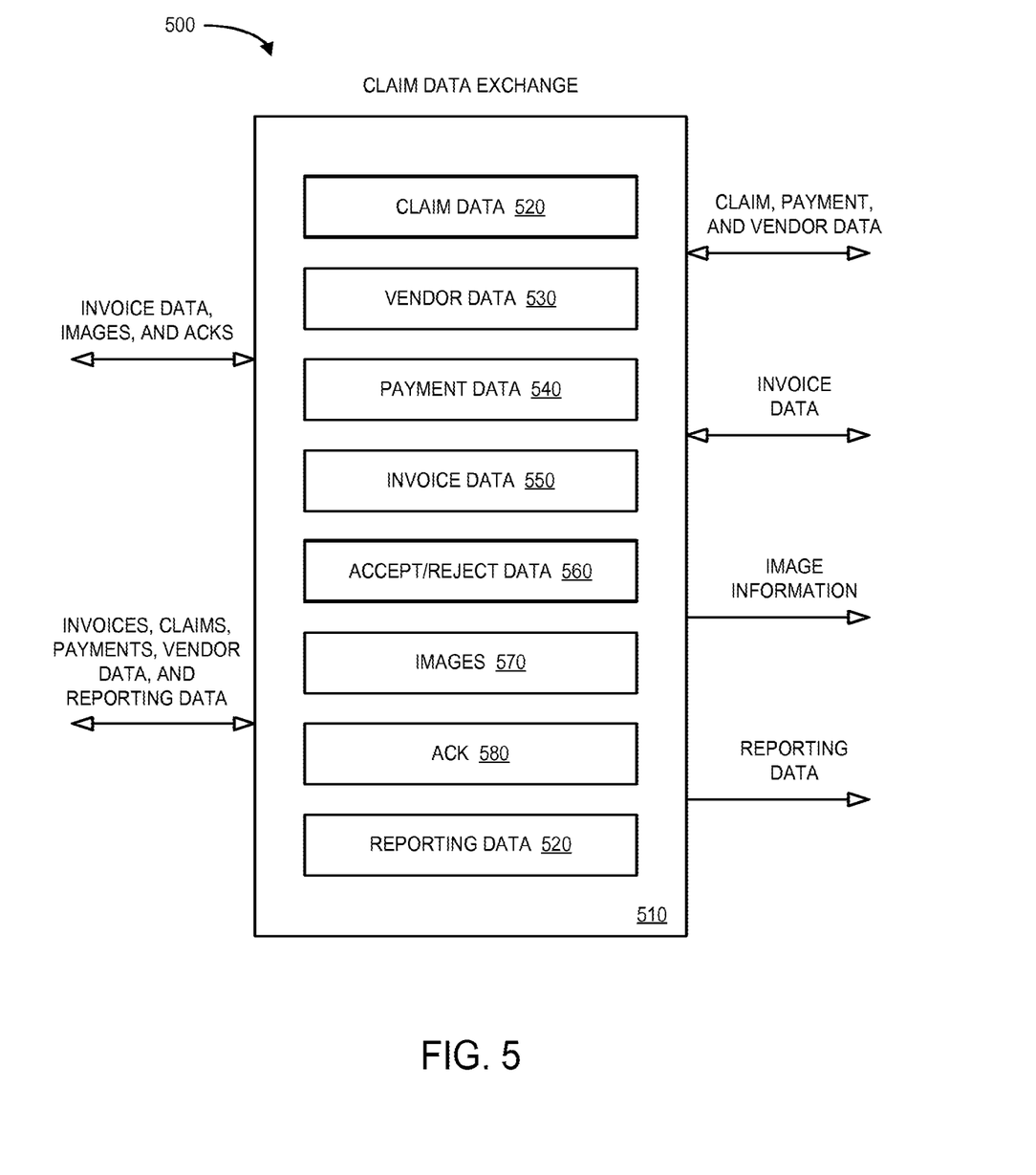
FIG. 5 is block diagram of a claim data exchange according to some embodiments of the present invention.

FIG. 5 is block diagram of a claim data exchange system 500 according to some embodiments of the present invention. The system 500 includes a claim data exchange apparatus 510 having various plug and play component elements, such as application or storage structures. Note that the system may receive and transmit data using common Input Output (IO) processing. For example, the claim data exchange apparatus 510 may store and manage information associated with claim data 520 (e.g., claimant name, address and employer); vendor data 530 (e.g., health care provider name and address); payment data 540 (e.g., amount and status or any payments made in connection with the claim); invoice data 550 (e.g., amount and vendor associated with each invoice or bill and/or associated transportation costs); accept/reject data 560 (e.g., indicating whether a claim was accepted or rejected); images 570 (e.g., pdf files of invoices and treatment notes); acknowledgements 580 (e.g., "ACK" messages transmitted to or receive other devices to ensure that message are properly received and acted upon); injury and incident data, and/or reporting data 520 (e.g., demographic and/or financial reports).

Figure 6:
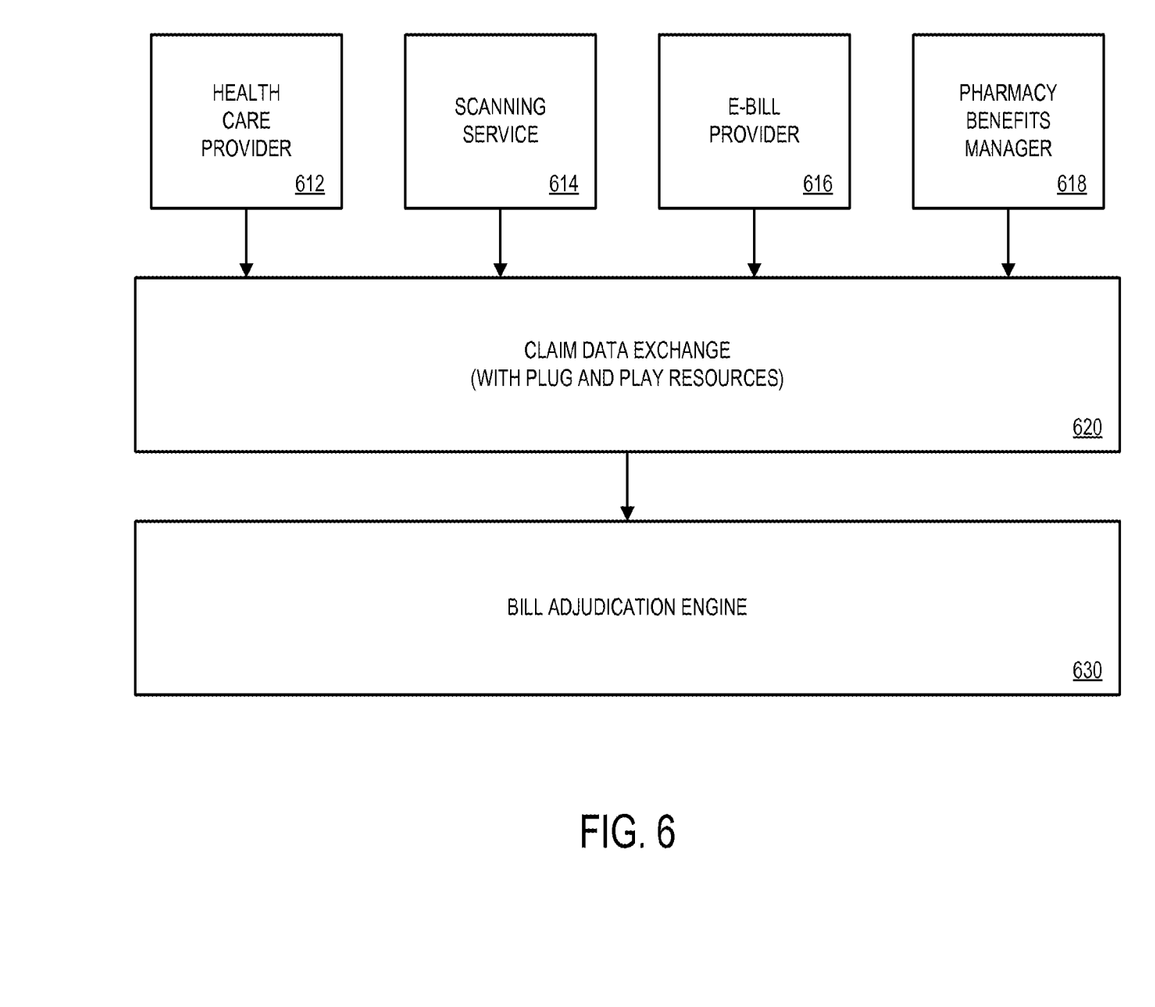
FIG. 6 is an information flow diagram according to some embodiments of the present invention.

FIG. 6 is an information flow diagram according to some embodiments of the present invention. In this case, a health care provider 612, a scanning service 614, an e-bill provider 616, and/or a pharmacy benefits manager 618 may submit claim information to a claim data exchange 620. In this case, the claim data exchange 620 (e.g., associated with a payor processing system) may receive workers' compensation claims from a plurality of remote bill input devices.

The claim data exchange 620 may automatically transform the workers' compensation claims in accordance with a jurisdiction-based claims processing rule (e.g., based on a zip code associated with a health care provider). According to some embodiments, claim data exchange 620 converts the workers' compensation claims into an extensible mark-up language format and/or exports data to a reporting system, a data warehouse, and/or a reconciliation engine. According to other embodiments, the claim data exchange 620 may provide exception handling processing for flagged workers' compensation claims and/or store image information associated with the workers' compensation claims in an image repository.

The claim data exchange 620 may then transmit the transformed workers' compensation claims directly to a workers' compensation bill adjudication engine 630. After being adjudicated, the bill adjudication engine 630 and/or claim data exchange 620 may arrange for a health care provider to receive payment based at least in part on information generated by the workers' compensation bill adjudication engine 630.

In this way, the payor claim data exchange 620 may provide significant control of certain functionality that was previously handled by third party systems (as illustrated in FIG. 1). This control may present improved opportunities, capabilities, and/or increased flexibility to respond to customer needs at a lower cost. Moreover, the claim data exchange 620 may be implemented using a "plug and play" environment while the bill adjudication engine 630 may comprise a platform supported in an Application Service Provider ("ASP") model. Such an approach may also facilitate partnering with external vendors (e.g., various e-bill providers 420) and networks for improved commodity services while reducing the need to continually modify these external applications and interfaces to incorporate payor specific requirements. This structure may also increase the ability to partner with various adjudication services, if necessary, to meet the needs of many different customers as well as partner with specialty, regional, and/or boutique networks to enhance claim outcomes and reduce network costs. Moreover, the approaches described herein may provide increased oversight through improved financial reconciliation and audit capabilities.

Figure 7:
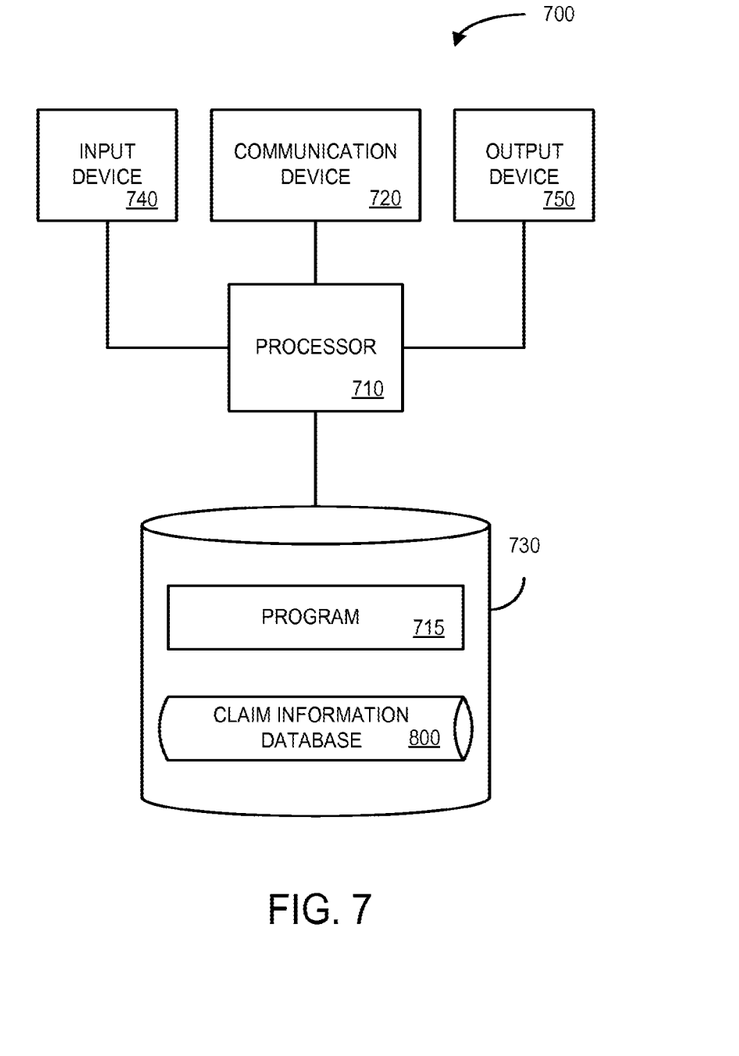
FIG. 7 is a block diagram of a claim data exchange apparatus in accordance with some embodiments of the present invention.

FIG. 7 is a block diagram of a claim data exchange apparatus 700 in accordance with some embodiments of the present invention. The apparatus 700 might, for example, comprise a platform or engine similar to the automated insurance processing platform 110 illustrated in FIG. 1. The apparatus 700 comprises a processor 710, such as one or more INTEL® Pentium® processors, coupled to a communication device 720 configured to communicate via a communication network (not shown in FIG. 7). The communication device 720 may be used to exchange insurance policy information, for example, with one or more remote devices.

The processor 710 is also in communication with an input device 740. The input device 740 may comprise, for example, a keyboard, a mouse, or computer media reader. Such an input device 740 may be used, for example, to enter information about claim rules, exception results, and/or vendors. The processor 710 is also in communication with an output device 750. The output device 750 may comprise, for example, a display screen or printer. Such an output device 750 may be used, for example, to provide reports and/or display information associated with demographic and/or financial data.

The processor 710 is also in communication with a storage device 730. The storage device 730 may comprise any appropriate information storage device, including combinations of magnetic storage devices (e.g., hard disk drives), optical storage devices, and/or semiconductor memory devices such as Random Access Memory (RAM) devices and Read Only Memory (ROM) devices.

The storage device 730 stores a program 715 for controlling the processor 710. The processor 710 performs instructions of the program 715, and thereby operates in accordance any embodiments of the present invention described herein. For example, the processor 710 may receive a first workers' compensation claim from a first remote bill input device and a second workers' compensation claim from a second remote bill input device. The processor 710 may further transform the first and second workers' compensation claims in accordance with a claims processing rule and transmit the transformed first and second workers' compensation claims to a workers' compensation adjudication engine.

As used herein, information may be "received" by or "transmitted" to, for example: (i) the insurance apparatus 700 from other devices; or (ii) a software application or module within the insurance apparatus 700 from another software application, module, or any other source.

As shown in FIG. 7, the storage device 730 also stores a claim information database 800. One example of such a database 800 that may be used in connection with the insurance apparatus 700 will now be described in detail with respect to FIG. 8. The illustration and accompanying descriptions of the database presented herein are exemplary, and any number of other database arrangements could be employed besides those suggested by the figures. For example, different databases associated with different types of policies or consumers might be associated with the apparatus 700.

Figure 8:
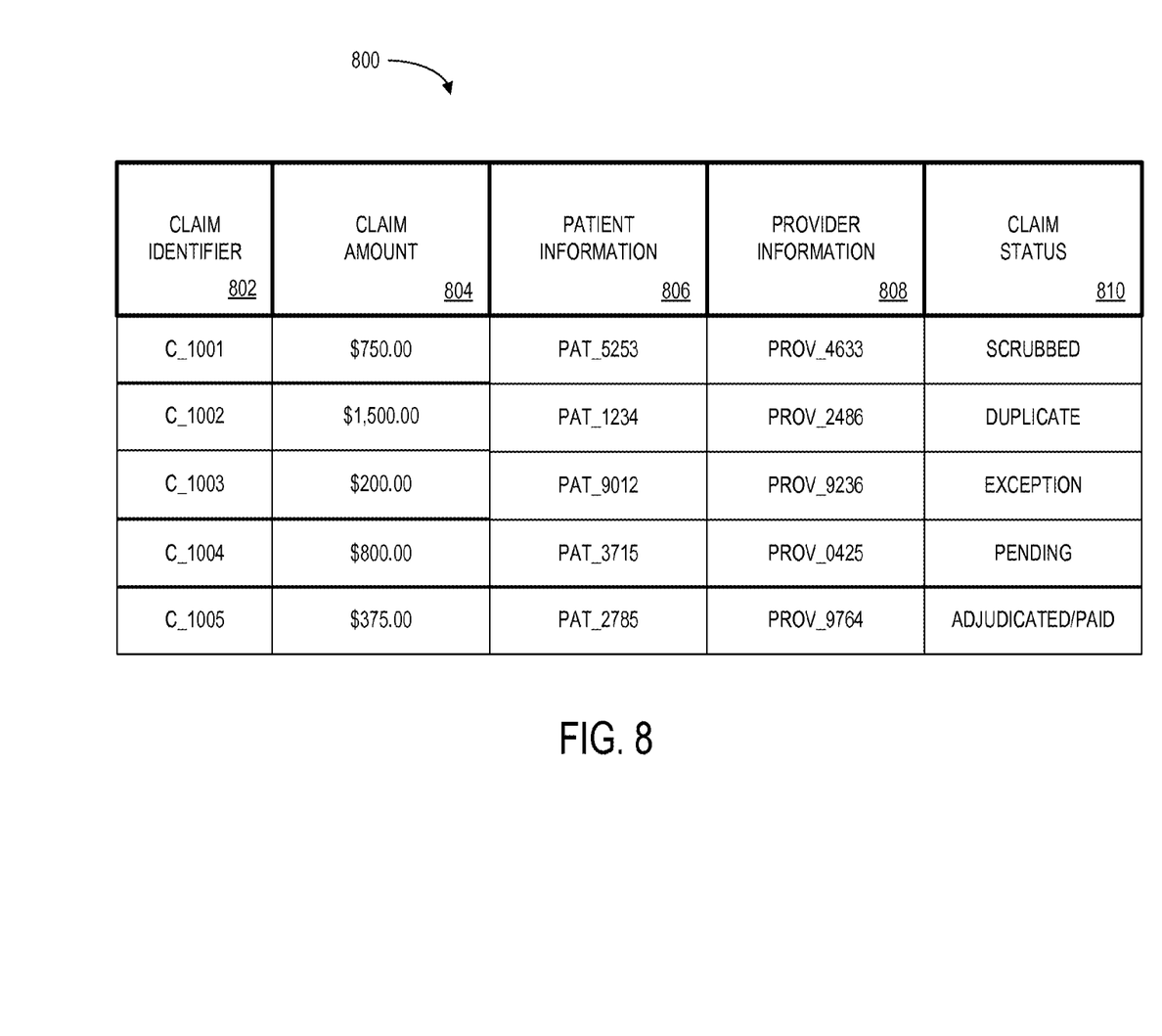
FIG. 8 is a tabular view of a portion of a claim information database in accordance with some embodiments of the present invention.

FIG. 8 is a tabular view of a portion of a claim information database 800 in accordance with some embodiments of the present invention. The table includes entries different insurance policies that have been issued to consumers. The table also defines fields 802, 804, 806, 808, 810 for each of the entries. The fields specify: a claim identifier 802, a claim amount 804, patient information 806, provider 808, and a claim status 810. The information in the database 800 may be periodically created and updated based on information received from bill input systems, a bill pre-processing system, a bill adjudication platform, and/or a claims processing system.

The claim identifier 802 may be, for example, an alphanumeric code associated with a workers' compensation claim that has been submitted by a health care provider. The claim amount 804 might represent a value of a requested claim or an adjusted value after adjudication. The patient information 806 might be an alphanumeric code associated with a worker who received treatment from the health care provider in connection with the claim. The provider information 808 might be an alphanumeric code associated with the health care provider who provided treatment to the injured worker. The claim status 810 might indicate, for example, that a particular claim has been scrubbed (e.g., the data has been cleaned up and/or supplemented), is considered a duplicate of a previously processed claim, is an exception (and therefore needs to be reviewed), is pending, and/or has been adjudicated or paid to the health care provider. The claim information database 800 may, for example, further be used to track each claim as it is being processed by the system and/or to generate notifications that work is waiting to be performed (e.g., an electronic message indicating that an administrator should take a particular action to help move a claim through the system).

Figure 9:
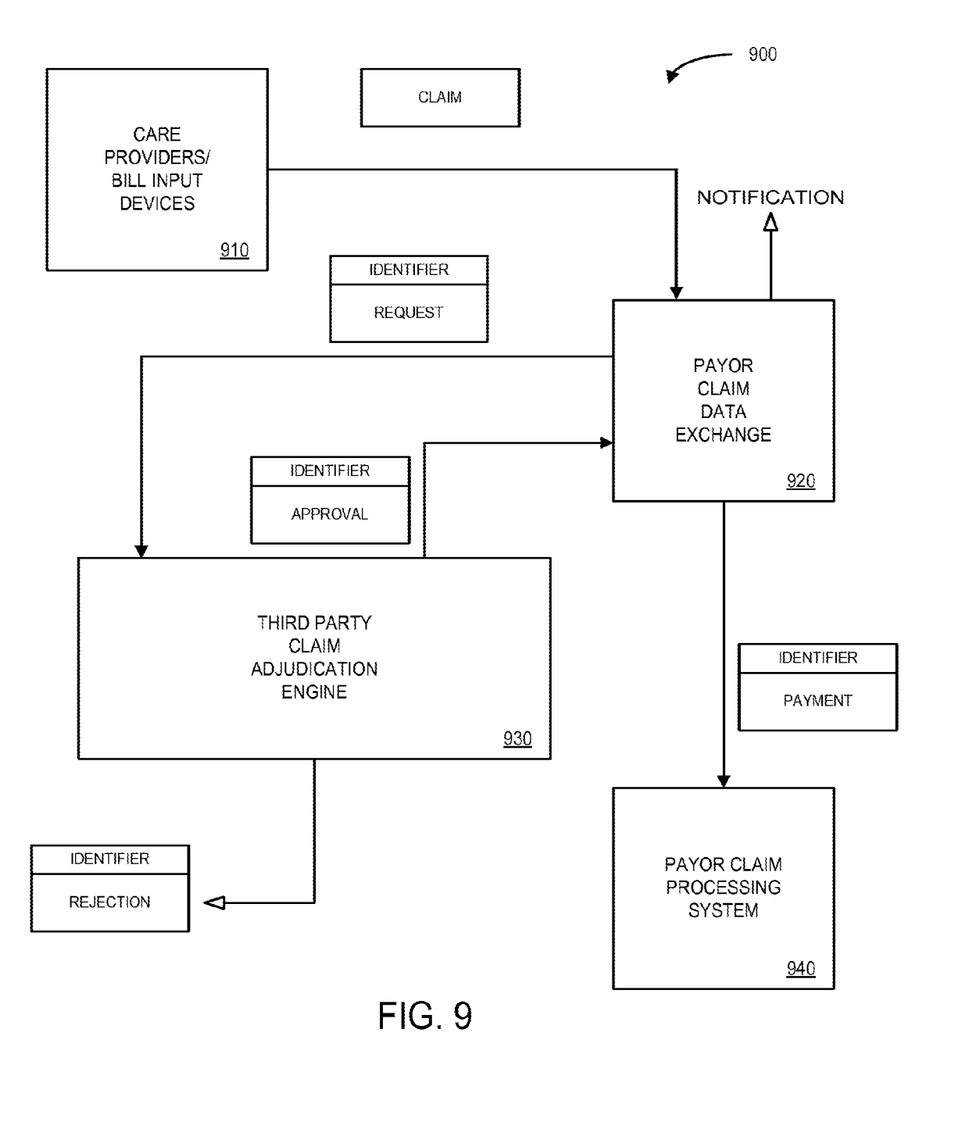
FIG. 9 is flow diagram of a how a workers' compensation claim might be processed according to some embodiments of the present invention.

For example, FIG. 9 is flow diagram 900 of a how a workers' compensation claim might be processed according to some embodiments of the present invention. In particular, a payor associated with an insurance program may facilitate payments made to health care providers 910. In this case, a care provider 910 may submit an invoice, bill, or claim to a remote payor claim data exchange 920 (e.g., by sending a paper invoice, a facsimile, or an electronic message to the payor claim data exchange 920).

The payor claim data exchange 920 may then automatically re-format the information and forward information about the claim to a third party claim adjudication engine 930 in a claim adjudication request along with an identifier (e.g., an alphanumeric code used to track the claim as it moves through the system). The third party claim adjudication engine 930 may then review the claim and determine whether or not the claim should be paid and/or an appropriate amount that should be paid to the care provider 910 (e.g., based on the workers' compensation rules applicable given the geographic location of the care provider 910). By way of examples only, the third party claim adjudication engine 930 might look for duplicate claims, incomplete or incorrect data in a required data field, and/or evaluate a claim number to determine whether or not it is valid. Claim rejections may be output along with the claim identifier for further processing.

If the request is approved, the third party claim adjudication engine 930 may then return a claim approval, along with the claim identifier, to the payor claim data exchange 920. The payor claim data exchange 920 may, according to some embodiments, automatically generate notifications (e.g., when manual process of a claim is required). The payor claim data exchange may eventually transmit payment data, along with the claim identifier, to a payor claim processing system 940, which in turn may arrange for the care provider 910 to receive payment.

As a result of the embodiments described herein, the cost of maintaining an automated claim processing system for a payor may be reduced. Moreover, the approaches may help reduce errors and result in faster payments to medical care providers. That is, embodiments may achieve cost savings and improved service levels by implementing an improved medical bill processing system to support workers' compensation medical bill processing. Further, the approaches may provide a flexible technology solution that supports the creation of a modular infrastructure (e.g., and enable partnering with specialty, regional and boutique networks to enhance claim outcomes and reduce network costs). Moreover, embodiments may provide a robust adjudication functionality that will enable the automated release of bills for workers' compensation care providers, without an individual reviewing them. The increased automation may also improve bill payment accuracy, reduce turn around time, and reduce overall costs associated with the insurance programs.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases and engines described herein may be split, combined, and/or handled by external systems).

Applicants have discovered that embodiments described herein may be particularly useful in connection with workers' compensation insurance products. Note, however, that other types of insurance products may also benefit from the invention (e.g., automobile insurance claims). For example, claims associated with an automobile insurance program (e.g., repair or medical bills) might be received by an automated claims data exchange and then be automatically cleaned and forwarded to an automobile claims adjudication engine. Moreover, although examples of specific types of health care bills have been used, embodiments of the present invention could be used with other types of costs (e.g., laboratory fees).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A computer system for transforming data from a plurality of remote scanning services corresponding to paper claims documents, for processing by third party computer systems, comprising:
   a payment processing system configured to process payments for workers' compensation claims based on data received from a third party application service provider bill adjudication system;
   a pre-processing system configured to:
      receive, by a pre-processing communications device, images corresponding to workers' compensation claims from an image repository database;
      verify, for each of the workers' compensation claims, whether the claim is eligible for coverage; and
      responsive to a negative verification for ones of the workers' compensation claims, generate claim verification work requests for each of the ones of the workers' compensation claims; and
      responsive to a positive verification for other ones of the workers' compensation claims, transmit by the pre-processing communications device to the data exchange server, data corresponding to the other ones of the workers' compensation claims;
   a data exchange server including plug and play components, the data exchange server interposed between care provider bill input devices and the third party application service provider adjudication system, and communicatively coupled to the payment processing system, configured to:
      receive, by a data exchange communications device from scanning service systems, images corresponding to paper workers' compensation claims forms;
      store, by the data exchange communications device, the images corresponding to the workers' compensation claims in the image repository;
      receive, by the data exchange communications device from the pre-processing communications device, data indicative of a first workers' compensation claim and data indicative of a second workers' compensation claim, wherein the first workers' compensation claim and the second workers' compensation claim correspond to the other ones of the workers' compensation claims verified by the pre-processing system;
      determine a first geographic location associated with the data indicative of the first workers' compensation claim;
      determine a second geographic location associated with the data indicative of the second workers' compensation claim;
      select, based on the first geographic location, from a database in a data storage device storing a plurality of claims processing requirements corresponding to a plurality of geographic locations, a first claims processing requirement for the data indicative of the first workers' compensation claim;
      select, based on the second geographic location, from the database storing a plurality of claims processing requirements corresponding to a plurality of geographic locations, a second claims processing requirement for the data indicative of the second workers' compensation claim; and
      transform the data indicative of the first workers' compensation claim in accordance with the first claims processing requirement and convert the transformed first worker's compensation claim data to an extensible markup format;
      transform the data indicative of the second workers' compensation claim in accordance with the second claims processing requirement and convert the transformed second worker's compensation claim data to an extensible markup format;
      periodically transmit, by the data exchange communications device in a batch process, transformed data indicative of workers' compensation claims including the transformed data indicative of the first workers' compensation claim in the extensible markup format and the transformed data indicative of the second workers' compensation claims in the extensible markup format to a third party application service provider claim adjudication computer;
      receive, from the third party application service provider claim adjudication computer, data indicative of whether the first workers' compensation claim should be paid and data indicative of whether the second workers' compensation claim should be paid; and
      transmit, to the payment processing system, the data indicative of whether the first workers' compensation claim should be paid and the data indicative of whether the second workers' compensation claim should be paid; and
   one or more reporting systems configured to:
      receive, by a reporting system communications device from the data exchange communications device, the workers' compensation claims data; and
      generate, based on the workers' compensation claims data, one or more of claims financial reports, actuarial services data, and preferred provider organization bulk bill reporting.

2. The computer system of claim 1, wherein each of the plurality of geographic locations corresponds to a state and wherein each of the plurality of claims processing requirements correspond to requirements applicable to a state.

3. The computer system of claim 1, wherein the database further stores data relating to a plurality of care providers;
   wherein the data indicative of the first workers' compensation claim includes data indicative of a care provider,
   wherein the first claims processing requirement corresponds to an automated vendor identification process, and
   wherein the data exchange server being configured to transform the data indicative of the first workers' compensation claim in accordance with the first claims processing requirement comprises the data exchange server being configured to:
      determine an identity of the care provider based on the data indicative of the care provider and the data relating to the plurality of care providers stored in the database;
      determine whether a threshold level of confidence concerning the determined identity of the care provider has been attained; and
      responsive to an affirmative determination that a threshold level of confidence concerning the determined identity of the care provider has been attained, supplement the data indicative of the first workers' compensation claim with additional data relating to the determined care provider stored in the database.

4. The computer system of claim 1, wherein the database further stores data indicative of previously processed claims;

wherein the first claims processing requirement is associated with a duplicate claim identification process; and
wherein the data exchange server being configured to transform the data indicative of the first workers' compensation claim in accordance with the first claims processing requirement comprises the data exchange server being configured to:
compare the data indicative of the first workers' compensation claim to the data indicative of previously processed claims stored in the database;
determine whether the data indicative of the first workers' compensation claim corresponds to one of the previously processed claims; and
responsive to an affirmative determination that the data indicative of the first workers' compensation claim corresponds to one of the previously processed claims, generate a graphical display to identify the data indicative of the first workers' compensation claim as being a duplicate claim to one of the previously processed claims.

5. The computer system of claim 1, wherein the plurality of claims processing requirements corresponding to the plurality of geographic locations stored in the database comprises claim formatting requirements for each of the plurality of geographic locations;
wherein the first claims processing requirement comprises a claim formatting requirement corresponding to the first geographic location;
wherein the data exchange server being configured to transform the data indicative of the first workers' compensation claim in accordance with the first claims processing requirement comprises the data exchange server being configured to reformat the data indicative of the first workers' compensation claim based on the claims formatting requirement corresponding to the first geographic location.

6. The computer system of claim 5, wherein the claim formatting requirements comprise code requirements for each of the plurality of geographic locations.

7. The computer system of claim 1, wherein the plurality of claims processing requirements stored in the database comprises one or more of payment amount requirements, payment timing requirements, and treatment requirements for each of the plurality of geographic locations.

8. The computer system of claim 1, wherein at least one of the first and second remote bill input devices are associated with at least one of: (i) a health care provider computer, (ii) a scanning service computer, (iii) an e-bill provider computer, and (iv) a pharmacy benefits manager computer.

9. The computer system of claim 1, wherein the bill pre-processing computer is further configured to:
exchange bill data, for each of the first workers' compensation claim and the second workers' compensation claim, with the data exchange communications device;
determine, for each of the first workers' compensation claim and the second workers' compensation claim, whether the claim includes a non-standard medical bill; and
output data indicative of the determination of whether the claim includes a non-standard medical bill.

10. The computer system of claim 1, further comprising a claims processing system computer, and
wherein the data exchange server is further configured to:
receive, by the data exchange server from the third party claim adjudication computer, for each of the first workers' compensation claim and the second workers' compensation claim, one or both of data indicative of whether a claim should be paid and data indicative of an amount that should be paid to a provider;
transmit, by the data exchange communications device to the claims processing system computer, for each of the first workers' compensation claim and the second workers' compensation claim, the one or both of the data indicative of whether the claim should be paid and the data indicative of the amount that should be paid to the provider.

11. The computer system of claim 10, wherein the claims processing system computer is configured to:
receive, by a claim processing system communications device from the third party claim adjudication computer, for each of the first workers' compensation claim and the second workers' compensation claim, the one or both of the data indicative of whether the claim should be paid and the data indicative of the amount that should be paid to the provider;
arrange for payment to providers, for ones of the first workers' compensation claim and the second workers' compensation claim having affirmative data indicative of whether the claim should be paid.

12. A computer-implemented method for transforming data from a plurality of remote scanning services corresponding to paper claims documents, for processing by third party computer systems, comprising:
receive, by a pre-processing communications device, images corresponding to workers' compensation claims from an image repository database;
verify, by a pre-processing computer system for each of the workers' compensation claims, whether the claim is eligible for coverage; and
responsive to a negative verification for ones of the workers' compensation claims, generate, by the pre-processing computer system, claim verification work requests for each of the ones of the workers' compensation claims; and
responsive to a positive verification for other ones of the workers' compensation claims, transmit by the pre-processing communications device to the data exchange server, data corresponding to the other ones of the workers' compensation claims;
interposing a data exchange computer system between care provider bill input devices and the third party application service provider adjudication system, the data exchange computer system communicatively coupled to the payment processing system,
receiving, by the data exchange communications device from scanning service systems, images corresponding to paper workers' compensation claims forms;
storing, by the data exchange communications device, the images corresponding to the workers' compensation claims in the image repository;
receiving, by the data exchange communications device from the pre-processing communications device, data indicative of a first workers' compensation claim and data indicative of a second workers' compensation claim, wherein the first workers' compensation claim and the second workers' compensation claim correspond to the other ones of the workers' compensation claims verified by the pre-processing system;
determining, by one or more data exchange computer processors of the data exchange computer system, a first geographic location associated with the data indicative of the first workers' compensation claim;

determining, by the one or more data exchange computer processors, a second geographic location associated with the data indicative of the second workers' compensation claim;

selecting, by the one or more data exchange computer processors based on the first geographic location, from a plurality of claims processing requirements stored in one or more data exchange data storage devices, a first claims processing requirement for the data indicative of the first workers' compensation claim;

selecting, by the one or more data exchange computer processors based on the second geographic location, from a plurality of claims processing requirements stored in the one or more data exchange data storage devices, a second claims processing requirement for the data indicative of the second workers' compensation claim;

transforming, by the one or more data exchange computer processors, the data indicative of the first workers' compensation claim in accordance with the first claims processing requirement and converting the transformed first worker's compensation claim data to an extensible markup format;

transforming, by the one or more data exchange computer processors, the data indicative of the second workers' compensation claim in accordance with the second claims processing requirement and converting the transformed second worker's compensation claim data to an extensible markup format; and periodically transmitting in a batch process, by a data exchange communications device, transformed data indicative of workers' compensation claims including the transformed data indicative of the first workers' compensation claim in the extensible markup format and the transformed data indicative of the second workers' compensation claims in the extensible markup format to a third party application service provider claim adjudication computer;

transmitting, to the payment processing system, the data indicative of whether the first workers' compensation claim should be paid and the data indicative of whether the second workers' compensation claim should be paid; and receiving, by a reporting system communications device from the data exchange communications device, the workers' compensation claims data; and generating, by one or more reporting systems based on the workers' compensation claims data, one or more of claims financial reports, actuarial services data, and preferred provider organization bulk bill reporting.

13. The computer-implemented method of claim 12, further comprising transmitting, by the data exchange communications device, the transformed data indicative of the first workers' compensation claim and the transformed data indicative of the second workers' compensation claims to a bill pre-processing computer configured to determine if one or both of the first workers' compensation claim and the second workers' compensation claim includes a non-standard medical bill.

14. The computer-implemented method of claim 12, further comprising:
receiving, by the data exchange computer from the third party claim adjudication computer, for each of the first workers' compensation claim and the second workers' compensation claim, one or both of data indicative of whether the claim should be paid and data indicative of an amount that should be paid to a provider corresponding to the claim; and transmitting, by the data exchange communications device to a claims processing system computer, for each of the first workers' compensation claim and the second workers' compensation claim, the one or both of the data indicative of whether the claim should be paid and the data indicative of the amount that should be paid to the provider for the plurality of claims;

receiving, by the claims processing system computer, for each of the first workers' compensation claim and the second workers' compensation claim, the one or both of the data indicative of whether the claim should be paid and the data indicative of the amount that should be paid to the provider; and arranging, by one or more claims processing system computer processors of the claims processing system computer, for payment to providers, for the ones of the first workers' compensation claim and the second workers' compensation claim having affirmative data indicative of whether the claim should be paid.

15. A computer system for transforming data from a plurality of remote scanning services corresponding to paper claims documents, for processing by a third party computer system, comprising:

a payment processing system configured to process payments for workers' compensation claims based on data received from a third party application service provider bill adjudication system;

a pre-processing system configured to:
receive, by a pre-processing communications device, images corresponding to workers' compensation claims from an image repository database;
verify, for each of the workers' compensation claims, whether the claim is eligible for coverage; and
responsive to a negative verification for ones of the workers' compensation claims, generate claim verification work requests for each of the ones of the workers' compensation claims; and
responsive to a positive verification for other ones of the workers' compensation claims, transmit by the pre-processing communications device to the data exchange server, data corresponding to the other ones of the workers' compensation claims;

a data exchange server including plug and play components, the data exchange server interposed between care provider bill input devices and the third party application service provider adjudication system, and communicatively coupled to the payment processing system, configured to:
receive, by a data exchange communications device from scanning service systems, images corresponding to paper workers' compensation claims forms;
store, by the data exchange communications device, the images corresponding to the workers' compensation claims in the image repository;
receive, by the data exchange communications device from the pre-processing communications device, data indicative of a first workers' compensation claim and data indicative of a second workers' compensation claim, wherein the first workers' compensation claim and the second workers' compensation claim correspond to the other ones of the workers' compensation claims verified by the pre-processing system;

determine a first state associated with the data indicative of the first workers' compensation claim;

determine a second state associated with the data indicative of the second workers' compensation claim;

select, based on the first state, from a database in a data storage device storing a plurality of claims processing requirements corresponding to a plurality of states, a first claims processing requirement for the data indicative of the first workers' compensation claim;

select, based on the second state, from the database storing a plurality of claims processing requirements corresponding to a plurality of states, a second claims processing requirement for the data indicative of the second workers' compensation claim; and transform the data indicative of the first workers' compensation claim in accordance with the first claims processing requirement and convert the transformed first worker's compensation claim data to an extensible markup format;

transform the data indicative of the second workers' compensation claim in accordance with the second claims processing requirement and convert the transformed second worker's compensation claim data to an extensible markup format;

periodically transmit, by the data exchange communications device in a batch process, transformed data indicative of workers' compensation claims including the transformed data indicative of the first workers' compensation claim in the extensible markup format and the transformed data indicative of the second workers' compensation claims in the extensible markup format to a third party application service provider claim adjudication computer;

receive, from the third party application service provider claim adjudication computer, data indicative of whether the first workers' compensation claim should be paid and data indicative of whether the second workers' compensation claim should be paid; and transmit, to the payment processing system, the data indicative of whether the first workers' compensation claim should be paid and the data indicative of whether the second workers' compensation claim should be paid; and one or more reporting systems configured to:

receive, by a reporting system communications device from the data exchange communications device, the workers' compensation claims data; and generate, based on the workers' compensation claims data, one or more of claims financial reports, actuarial services data, and preferred provider organization bulk bill reporting.

16. The computer system of claim 15, wherein the database further stores data relating to a plurality of care providers;

wherein the data indicative of the first workers' compensation claim includes data indicative of a care provider, wherein the first claims processing requirement corresponds to an automated vendor identification process, and wherein the data exchange server being configured to transform the data indicative of the first workers' compensation claim in accordance with the first claims processing requirement comprises the data exchange server being configured to:

identify the care provider based on the data indicative of the care provider and the data relating to the plurality of care providers stored in the database;

determine whether a threshold level of confidence concerning the identity of the identified care provider has been attained; and responsive to an affirmative determination that a threshold level of confidence concerning the identity of the identified care provider has been attained, supplement the data indicative of the first workers' compensation claim with additional data relating to the identified care provider stored in the database.

17. The computer system of claim 15, wherein the plurality of claims processing requirements corresponding to the plurality of states stored in the database comprises claim transmission format requirements for each of the plurality of states;

wherein the first claims processing requirement comprises a claim transmission format requirement corresponding to the first state;

wherein the data exchange server being configured to transform the data indicative of the first workers' compensation claim in accordance with the first claims processing requirement comprises the data exchange server being configured to reformat the data indicative of the first worker's compensation claim based on the first claims transmission format requirement.

18. The computer system of claim 15, further comprising a claims processing system computer, and wherein the data exchange server is further configured to:

receive, from the third party claim adjudication computer, for each of the first workers' compensation claim and the second workers' compensation claim, one or both of data indicative of whether a claim should be paid and data indicative of an amount that should be paid to a provider; and transmit, by the data exchange communications device to the claims processing system computer, for each of the first workers' compensation claim and the second workers' compensation claim, the one or both of the data indicative of whether the claim should be paid and the data indicative of the amount that should be paid to the provider;

wherein the claims processing system computer is configured to:

receive, by a claim processing system communications device from the third party claim adjudication computer, for each of the first workers' compensation claim and the second workers' compensation claim, the one or both of the data indicative of whether the claim should be paid and the data indicative of the amount that should be paid to the provider; and arrange for payment to providers, for the ones of the first workers' compensation claim and the second workers' compensation claim having affirmative data indicative of whether the claim should be paid.

* * * * *